United States Patent [19]

Ahlen et al.

[11] 4,056,177
[45] Nov. 1, 1977

[54] SIMPLIFIED ELECTRONIC PILOT AND REMOTE CONTROL SYSTEM FOR 1½ STAGE TRANSMISSION

[75] Inventors: Karl Gustav Ahlen; Gunnar Wahlsten, both of Stockholm, Sweden

[73] Assignee: S.R.M. Hydromekanik Aktiebolag, Sweden

[21] Appl. No.: 684,318

[22] Filed: May 7, 1976

[51] Int. Cl.$^2$ ............................................. F16D 47/06
[52] U.S. Cl. .................... 192/.032; 192/3.3; 192/3.31
[58] Field of Search ....................... 192/.032, 3.3, 3.31

[56] References Cited

U.S. PATENT DOCUMENTS

| | | | |
|---|---|---|---|
| 2,646,864 | 7/1953 | Miller et al. | 192/.032 |
| 3,068,974 | 12/1962 | Jandasek | 192/3.31 X |
| 3,581,851 | 6/1971 | Hall | 192/.032 X |
| 3,826,218 | 7/1974 | Hiersig | 192/.032 X |

Primary Examiner—Robert G. Nilson
Attorney, Agent, or Firm—Larson, Taylor and Hinds

[57] ABSTRACT

A control system is provided for connecting and disconnecting the block up clutch in a hydrodynamic torque converter for a prime mover. The system includes a first means for deriving a signal representative of the input speed of the prime mover, a second means for deriving signal representative the torque setting of the prime mover, and a comparator for comparing the signals and controlling the setting in accordance with that comparison. An output stage includes a relay responsive to the output of the comparator. A number of different embodiments are disclosed.

7 Claims, 9 Drawing Figures

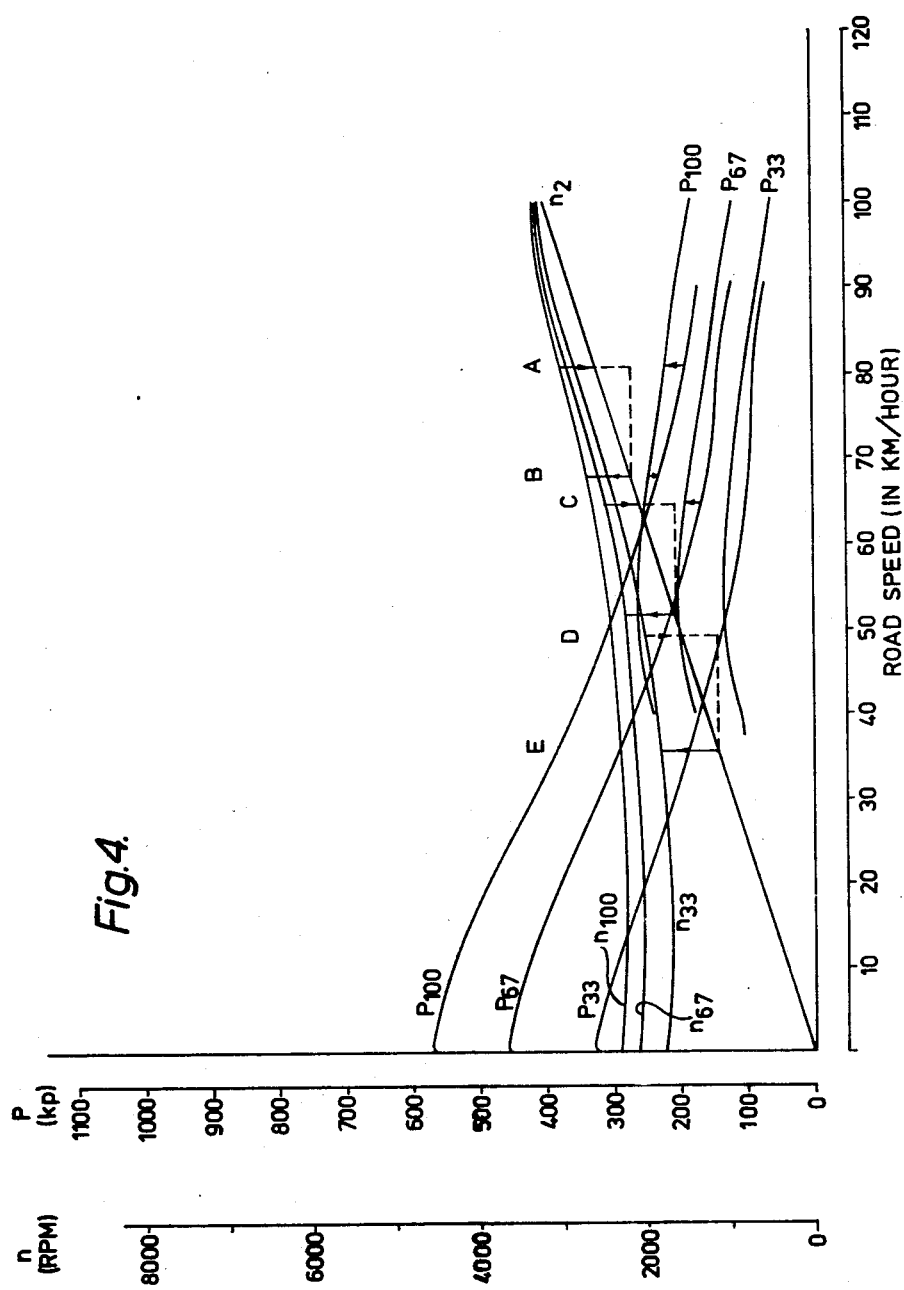

SIMPLIFIED ELECTRONIC PILOT AND REMOTE CONTROL SYSTEM FOR 1½ STAGE TRANSMISSION

This invention relates to the control of a hydrodynamic torque converter and especially the control of the cooperation of a hydrodynamic torque converter with lock-up clutch and release facility combined with mechanical transmissions of different kinds.

One problem with hydrodynamic torque converter transmission having a lock-up clutch is in controlling the connection and release of the direct drive in such a way that the direct drive is utilized to the maximum, especially when driving at constant speed. Control systems are known but they are generally too expensive to be used for simple applications. Furthermore, they are not entirely suited for use in a hydrodynamic torque converter transmission with a releasable bladed component or a release clutch in the drive line and a lock-up clutch for the torque converter, and syncromesh gears or other gears having holding clutches.

An object of the invention is to provide a system which for the control of the lock-up clutch needs impulses from the input drive conditions only, to control the utilization of the direct drive and also to give the driver the facility to select hydraulic drive and lock-up drive within suitable limits.

Another object of the invention is to provide a suitable system for releasing the drive through the torque converter and its lock-up clutch when shifting gears in a cooperating syncromesh gear box, at the same time as a shift granting reconnection to hydraulic drive is made, possibly followed by automatic reconnection of direct drive.

What we propose is to continuously compare the speed of the primary side of the torque converter with the torque for which the engine is set, allowance preferably being made for suitable hysteresis and for the relationship between the input speed and the torque setting of the engine. According to this invention a control system for connecting and disconnecting the lock-up clutch of a hydrodynamic torque converter comprises indicators for deriving signals representative of the input speed and torque setting of the prime mover, and means for comparing the signals and effectuating setting of the clutch in accordance with predetermined conditions.

Embodiments of the invention will now be described by way of example with reference to the accompanying drawings, of which:

FIG. 4 is a graph of the input speed and tractive effort against road speed, at full load, 67% load and 33% load, for a so-called 1½ stage torque converter, showing suitable shift points.

The embodiment to be described is equally applicable to the control of direct drive only, and is not limited to use with the specific type of transmission described or even to torque converters cooperting with multistop gear boxes, with release of the torque transmission through the torque converter is necessary through shifts.

Figure 1:
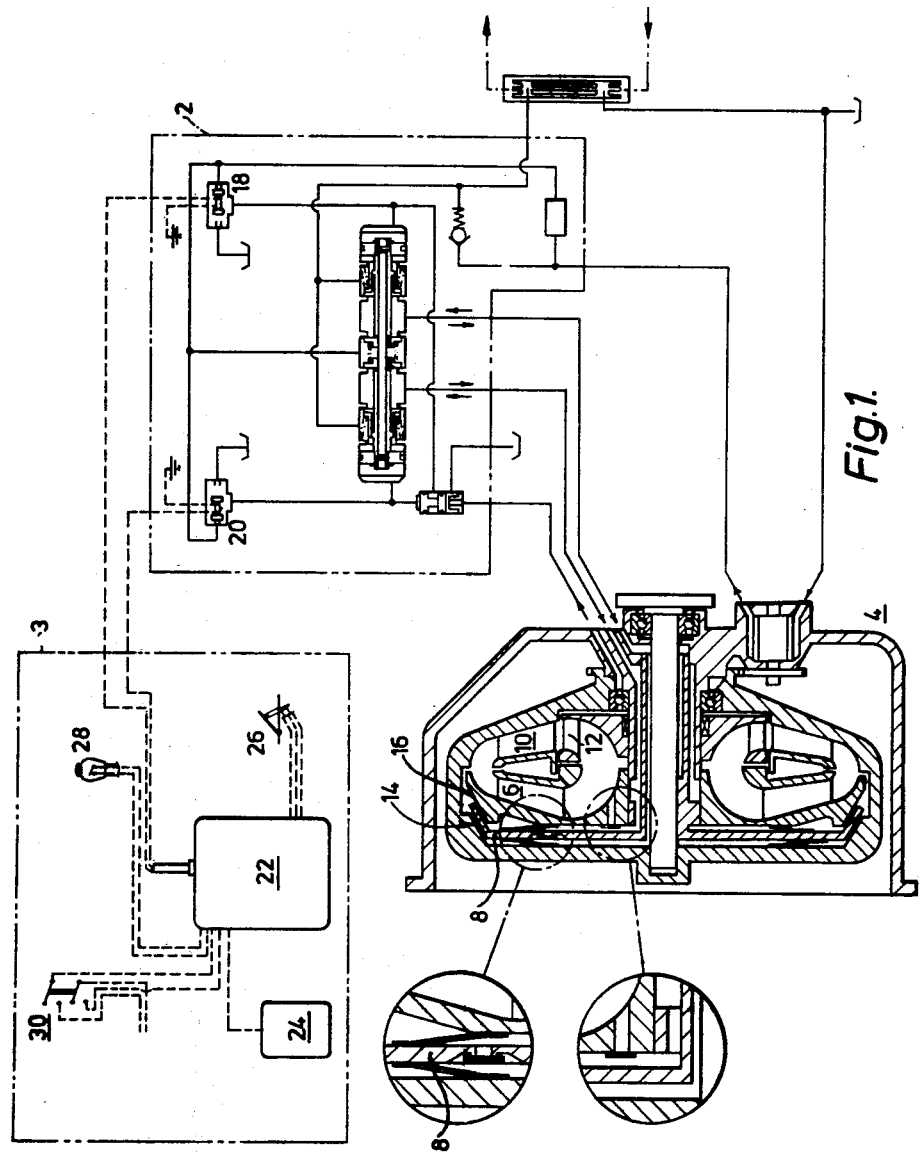
FIG. 1 shows schematically a torque converter transmission and its control system.

FIG. 1 shows a torque converter 4 of the 1½ stage type, having a releasable turbine 6 connectable and disconnectable from the disc 8, a rotating pump casing 10, a guide vane 12 and a lock-up clutch arrangement 14; the turbine 6 being connectable to a turbine shaft disc 8 through the clutch surfaces at 16. A valve unit 2 has three settings, referred to as "disconnected turbine," "connected tubine" and "connected lock-up clutch" and is controlled by two electro-hydraulic servo valves, namely a direct drive valve 18 and hydraulic drive valve 20, which, in turn, are controlled by the control elements encircled by line 3. These elements are a control circuit 22, a speed pulse producing device or pulse generator 24, a throttle setting transducer 26 and normally also the shift lever switch 28 and a starting/blocking device 30. These elements are shown in more detail in the circuit diagram of FIG. 2.

Figure 2:
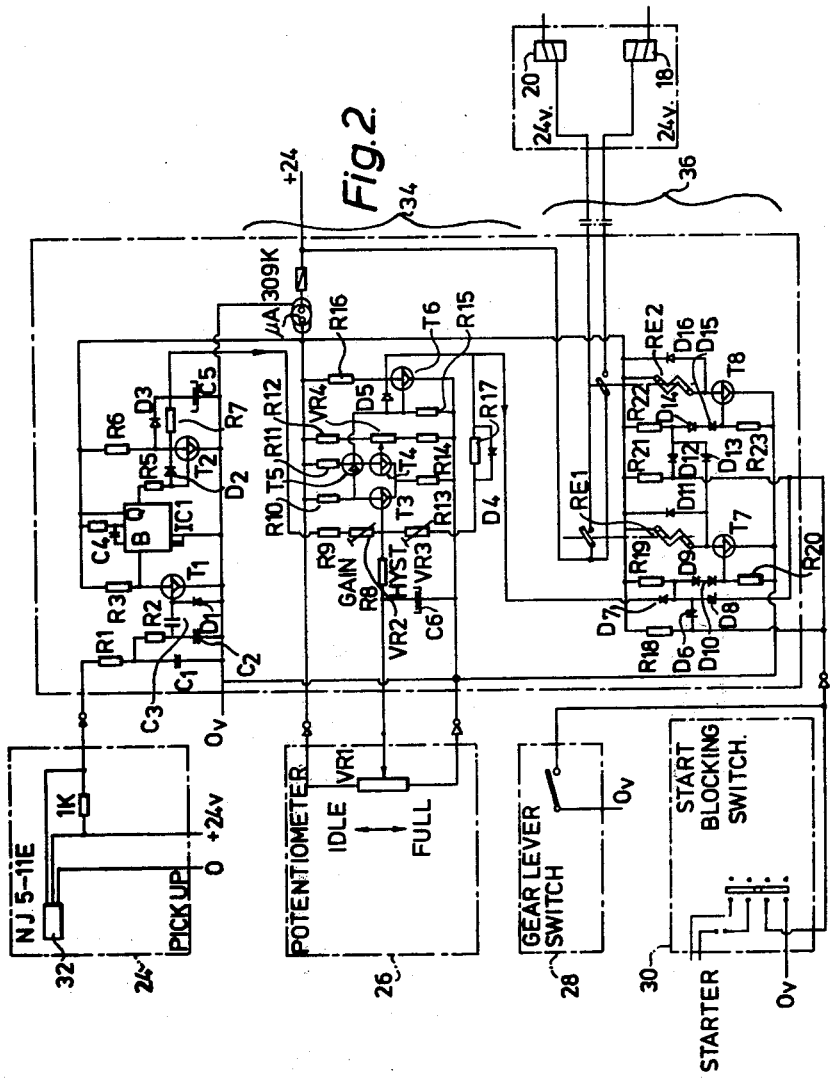
FIG. 2 is a diagram of an electronic control circuit and its connection to the electro-hydraulic control system of a torque converter.

Thus referring to FIG. 2, the throttle setting transducer 26 comprises a potentiometer adjustable in correspondence to the torque setting of the prime mover, while pulse producing device 24 comprises a pick-up 32 which produces a pulsed signal representing the speed of the prime mover a preferred embodiment of the control circuit 22 comprises the specific circuitry illustrated in FIG. 2. In general, this circuitry basically comprises a comparator indicated by bracket 34 for comparing the output of the potentiometer of transducer 26 with the input pulses produced by pick-up 32 and an output stage indicated by bracket 36 which receives the output of comparator 34 and includes relays responsive to that output for energizing the electro-hydraulic valves 18 and 20. The gear shift lever switch 28 is connected to output stage 36 and is used to effect positive release of the drive line through the torque converter during any kind of shift of complementary gears, be it a syncromesh gear, a holding clutch gear or even a full power shift gear in which it is not desired to drive through the torque converter during a shift. The starting/blocking switch 30, which is connected to output stage 36 and is typically located on the panel or steering column, is normally fitted on a torque converter to prevent starting of the engine except when the torque converter is set in neutral. This avoids creeping of the car when the engine is started.

Typical values for the individual components in the circuit of FIG. 2 are set out below:

| Resistors | | |
|---|---|---|
| R1 | 22 kΩ | |
| R2, R9 | 4.7 kΩ | |
| R3, R10 | 1.2 kΩ | |
| R4 | 39 kΩ | |
| R5, R13, R18-R23 | 3.3 kΩ | 1/4 W, 5% carbon film resistors |
| R6, R7 | 820 Ω | |
| R8, R16, R17 | 22 kΩ 47 kΩ | |
| R11, R15 | 6.8 kΩ | |
| R12, R14 | 8.2 kΩ | |
| Capacitors | | |
| C1 | 0.1 μF | |
| C2 | 0.22 μF | |
| C3 | 0.33 μF | flat foil |
| C4 | 0.068 – 0.22 μF | |
| C5 | 220 μF/10V | tantalum |
| C6 | 47 μF/6.3V | |

-continued

| Trimmers, Potentiometers | | |
|---|---|---|
| VR1 | 1 kΩ | ) Wirewound alt. cermet, 1W, 20% (4 Watt 40° C used) |
| VR2, VR4 | 10 kΩ | ) Carbon/cermet trimmers 20% |
| VR3 | 50 kΩ | ) |
| Semiconductors/Specification | | |
| D1-D16 | 1N4148 | |
| T1-T4, T6-T8 | BC 238 | |
| T5 | BCY 70 | |
| IC1 | SN 74121 N | |
| RE1, RE2 | SPST Reed Relays (Pickering 80-1-A-5/1) | |
| 1k carbon resistors, 0.5 W | | |
| NJ 5-11 E pick-up (Popperl & Fuchs) | | |
| V4T6Y1 microswitch (Burgess) | | |
| μA 309 K or μA 7805 KS tension regulator (Fairchild) | | |
| Type 4000 L Castelco | | |

The values of resistors R8, R16 and R17 are selected according to the desired functional relationship; lower values produce a steeper function and wider hysteresis. Higher values of C4 are used for lower maximum revolutions.

Instead of the transistors and diodes shown in FIG. 2, integrated circuits could be used, these being more reliable and less expensive, especially in series production.

Figure 2A:
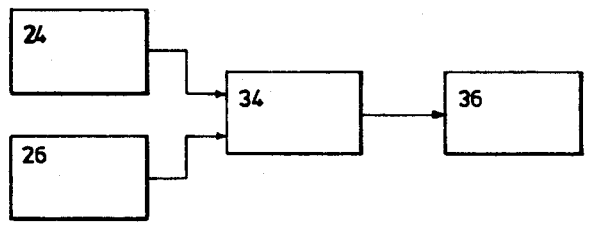
FIGS. 2a to 2e show various other electronic control circuits.

FIG. 2a shows a block diagram of the general electronic control circuit of FIG. 2; the basic blocks being the pulse producing device or pulse generator 24, throttle setting transducer 26, comparator 34 and output stage 36, all of which were discussed above.

Figure 2B:
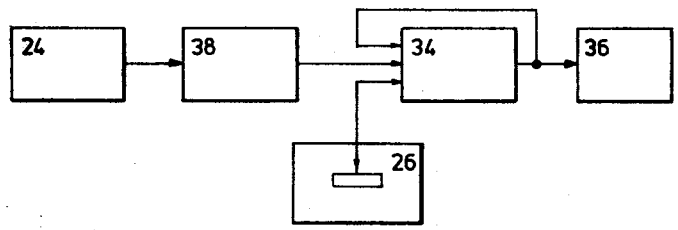

In the circuit of FIG. 2b, input signals from the device 24 and derived from a pick-up or from the ignition system, have a pulse frequency representative of the input speed and are passed to a frequency/voltage converter 38 which produces a voltage proportional to the pulse frequency. For each separate pulse of the input signal a monostable switch in the converter 38 delivers one unit impulse (fixed duration pulse), which is smoothed in a filter (not shown). The higher the frequency of the unit impulses, the higher d.c. voltage at output from the filter.

The transducer 26, which as discussed, is a potentiometer whose setting is proportional to the throttle setting, provides a second output voltage, and the magnitude of the two voltages are compared in a voltage comparator 34 comprising an amplifier with high gain and digital output. An relay output stage 36 serves the same function as in FIGS. 2 and 2a.

Figure 2C:
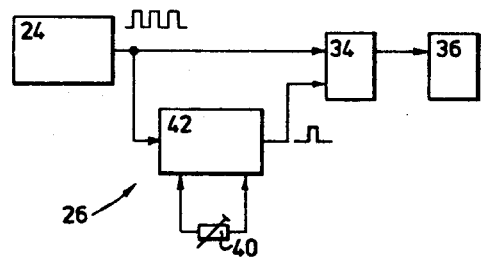

In the embodiment of FIG. 2c the input speed is represented as the pulse frequency of the input signal produced by pulse generator 24 ($f = 1/t_o$, $t_o =$ time period). The throttle setting transducer 26 includes a potentiometer 40 and a monostable switch 42, which is triggered by each input speed impulse from pulse generator 24. The comparator 34 may simply be a sampling flank (trailing edge) triggered flip-flop clocked by the input speed pulses from pulse producing device 24, the monostable switch 24 being connected to the "D" (data) input of the flip-flop. The duration of the output pulse produced by switch 42 depends on the throttle position as determined by potentiometer 40, and the output of comparator 42 depends on the relative durations of the pulses from device 24 and switch 42. This output drives the relay output stage 36.

Figure 2D:
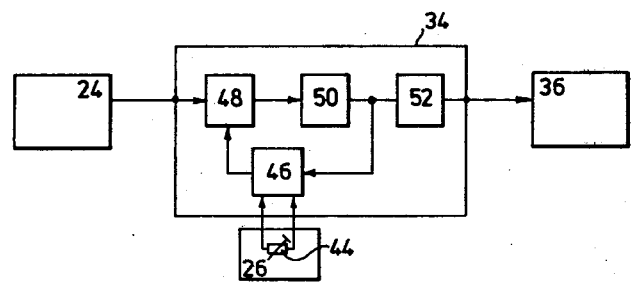

In the embodiment of FIG 2d, the input speed as before, is represented by the pulse frequency of the input signal produced by pulse producing device 24 and the throttle position, represented by the setting of a variable impedance device 44 such as potentiometer or an adjustable capacitor, controls the output frequency of a voltage-controlled oscillator (VCO) 46. This VCO 46 together with a phase detector 48, a low-pass filter 50 and an amplifier 52, form a phase-locked loop (PLL). In the phase detector 48 the phase and frequency of the input speed signal and that of the VCO signal are compared. The output signal from the phase detector 48 goes to the low-pass filter 50 and is fed back to the input of the VCO 46 so that the VCO 46 attains frequency and phase synchronization with the input-speed signal. The output signal from the VCO 46 thus is a function of the input speed as determined by pulse producing device 24 and as determined by the setting of variable impedance device 44 the throttle position and can be amplified to produce a binary output signal to the relay stage.

Figure 2E:
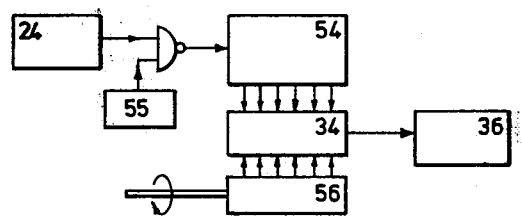

In the digital arrangement of FIG. 2e the speed signal is given by a digital frequency meter, such as, for example, a counter 54, which during a certain fixed time, as determined by a time base or reference circuit 55, counts the input speed pulses and the throttle setting transducer comprises an angle pick-up 56 comprising a syncro/digital converter, code disc with reading fork of the opto-type or corresponding units. Direct comparison of the two digital signals is made in a conventional digital comparator. Alternatively, the complete arrangement may comprise a micro-computer.

To take up the input signals indicating the speed and torque of the engine, to compare these with predetermined requirements and to produce control signals may be, as described, achieved in different ways. In accordance with the invention it is possible to determine shiftpoints, according to the subjective feelings of the driver, because his subconscious reactions give the correct driving combination if the electronic arrangement is set as described in the following explanation of FIG. 3.

Figure 3:
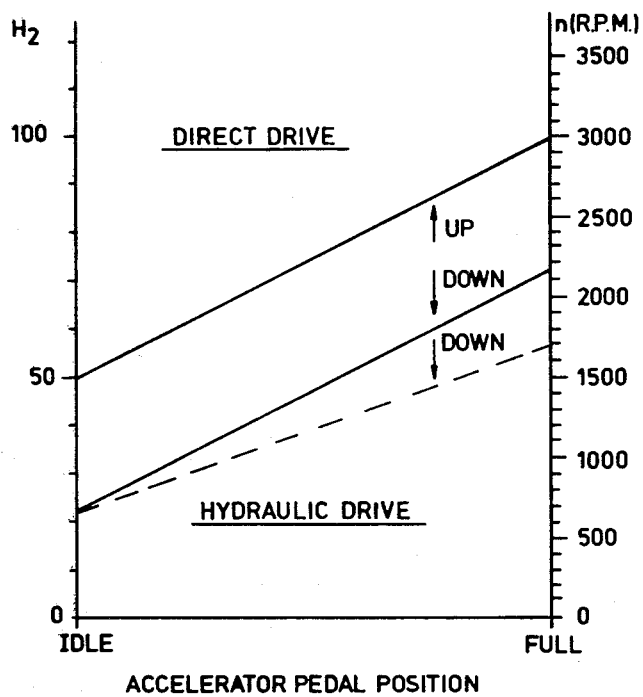
FIG. 3 is a graph showing the relationship between the engine torque setting and input rpm for different types of drive.

FIG. 3 shows a graph of the relationship between the engine setting and input speed n(rpm) for different types of drive, and the overlap which occurs, depending on from which side the unit approaches a shift condition. Normal connection lines are shown in full and an alternative down connection line is shown dotted. For instance, by accelerating the engine at full throttle, connection of direct drive will occur at $n_1 = 3,000$ rpm. If, however, the vehicle is then retarded to about $n_1 = 2,160$ rpm, hydraulic drive will be reconnected. At any partial load the same thing will occur, but at other speed limits. At one-third load the connection of direct drive may be made at $n_1$ 2,000 rmp. If, however, the driver wants to re-connect hydraulic drive, he only has to press the throttle up to about 80% of full throttle, so that hydraulic drive will be reconnected.

This permits reasonable utilization of direct drive. In practice, instead of accelerating at 80% load to reach sufficient speed, the system allows the driver to release the throttle pedal to about 30% load, whereupon direct drive is connected, and thereafter to increase the engine setting to the limit for reconnection of hydraulic drive.

The driver can select direct drive or hydraulic drive within certain limits. For each application the form of the limit lines, the hysteresis between connection of direct drive and reconnection of hydraulic drive, connection points of full throttle and connection points at idling, must be determined. The form of the curves can be selected by a variable drive connection between the movement of the throttle pedal and the setting of the potentiometer, while the hysteresis and the gain of the full power connection speed can be obtained by setting the potentiometers VR2, VR3 and VR4 of comparator 34 in FIG. 2.

FIG. 4 is a graph of input speed n(rpm) and tractive effort against road speed (kilometers/hour) in the highest gear for three different loads; 10%, 67% and 33% load. Connection of direct drive during acceleration is indicated by dotted lines and arrows at "A". Then with dotted line at "B" after retardation and at full power, there will be a reconnection to hydraulic drive. If, however, the throttle is released to 67% while in hydraulic drive at "C" or above "C", there will be an immediate connection of direct drive. For instance, if the throttle is released to 33% load, at "D" or at any point above "D", there will be a connection of direct drive. If the vehicle continues to retard under 33% load and it retards to "E", then the hydraulic drive will also be reconnected automatically. On the other hand, if while driving at 33% load and accelerating to any higher speed, but below "D", it is desired to reconnect hydraulic drive, it would only be necessary to increase the throttle position. The use of the throttle is natural in such a situation and the correct driving condition to achieve the maximum saving of fuel is automatically selected, i.e. direct drive will be utilized at partial load even at low speeds and hydraulic drive will be utilized at high throttle up to high speed, which ensures lowest fuel consumption at partial load and the highest acceleration at maximum load, which is just what is wanted and this is effected without requiring speed measurements on both the primary and the secondary side.

What we claim is:

1. A control system for connecting and disconnecting the lock-up clutch in a hydrodynamic torque converter for a prime mover, comprising first means for deriving a signal representative of the input speed of the prime mover, second means for deriving a signal representative of the torque setting of the prime mover, and means for comparing the signals and for controlling the setting of the clutch in accordance with that comparison.

2. A control system according to claim 1, wherein the system comprises an electronic circuit, said first, speed signal deriving means comprising a speed sensor, and said comparing means comprising a comparator and an output stage including relay means responsive to the output of said comparator.

3. A control system according to claim 2, wherein the comparator comprises a high gain amplifier.

4. A control system according to claim 1, wherein said first and second means comprise means for generating respective input signals representative of the input speed and torque setting as a function of time and said comparing means comprises a flip-flop circuit for comparing the input signals.

5. A control system according to claim 1, wherein said first and second means comprise means for generating input signals representative of the input speed and torque setting as a function of frequency and said comparing means comprise a frequency comparator.

6. A control according to claim 1, wherein said first and second means comprises means for generating input signals representative of the input speed and torque setting as a function of frequency and said comparing means comprises a phase comparator.

7. A control system according to claim 1, wherein said first and second means comprises means for generating input signals representative of input speed and throttle position which are in digital form and said respective comparing means comprising a digital comparator.

* * * * *